J. H. GLAUBER.
WATER DISTRIBUTING DEVICE.
APPLICATION FILED MAR. 21, 1912.
1,066,104.
Patented July 1, 1913.
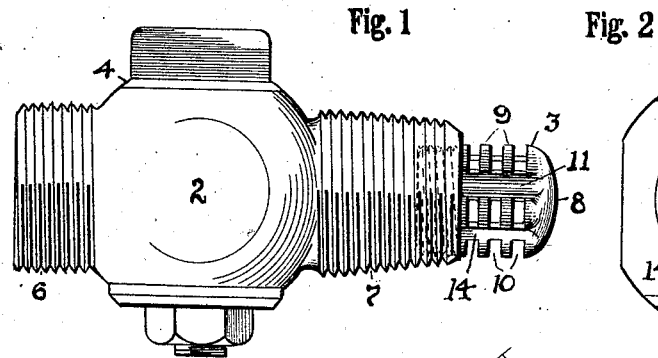
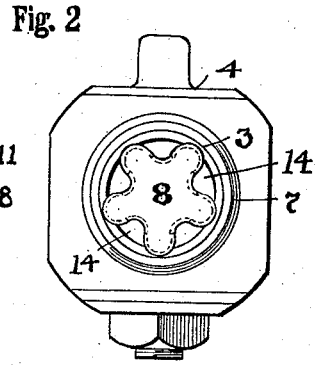
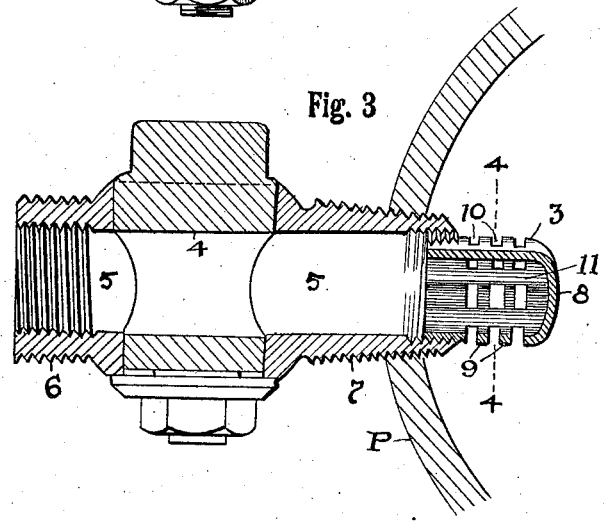
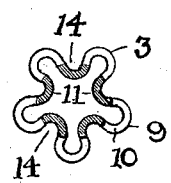
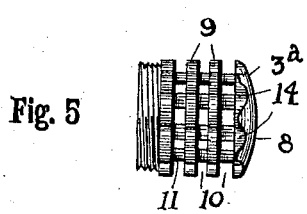
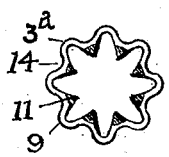
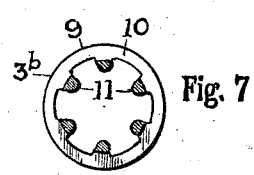
INVENTOR
Joseph H. Glauber
BY Fisher & Moser ATTYS.
ATTEST
E. M. Fisher
J. C. Museum

UNITED STATES PATENT OFFICE.

JOSEPH H. GLAUBER, OF CLEVELAND, OHIO.

WATER-DISTRIBUTING DEVICE.

1,066,104. Specification of Letters Patent. Patented July 1, 1913.

Application filed March 21, 1912. Serial No. 685,140.

*To all whom it may concern:*

Be it known that I, JOSEPH H. GLAUBER, citizen of the United States, residing at Cleveland, in the county of Cuyahoga and State of Ohio, have invented certain new and useful Improvements in Water - Distributing Devices, of which the following is a specification.

My invention comprises a valve or other water - distributing device having an improved guard at its intake end, the primary object of which is to prevent eels, small fish, or floating matter from entering and clogging the water passage. Various devices have heretofore been employed for the same purpose, but my invention differs therefrom in improvements which materially strengthen the guard and make it more convenient and economical to manufacture and also more effective for the accomplishment of the object for which it is primarily designed.

In the accompanying drawings, Figure 1 is a side view of a valve embodying my improved guard, and Fig. 2 is an end view thereof. Fig. 3 is a sectional view centrally through the valve and guard, and Fig. 4 is a cross section of the guard alone, on line 4—4, Fig. 3. Fig. 5 is a side view and Fig. 6 a cross section of a modified form of guard. Fig. 7 is a cross section of a guard having features in common with the foregoing devices, but not corrugated.

As illustrated, the valve 2 with which my improved guard 3 is incorporated, is of a common type having a plug 4 with a water-way in line with the water passage 5 within the threaded extremities 6 and 7, respectively. Extremity 7 is the intake or tap end which screws into the side of the main or service-pipe P, and the guard 3 is located at this end of the valve, being either removably mounted or permanently affixed therein. As shown the guard is a separate removable member screwed into extremity 7, but it may be cast integrally therewith or soldered thereto. Guard 3 is portrayed as a hollow thimble having a closed end 8 and open side walls comprising a series of parallel annular ribs 9 which are spaced apart by relatively narrow cross slots 10. These slots must be relatively narrow to guard against the entrance of eels or small fish and are therefore preferably produced by cutting or machining the body instead of being cast therein. Rough or ragged edges accumulate and hold matter which easily clogs up narrow slots, but machining gives smooth and finished faces to the slots and minimize troubles of this nature. On the other hand, the use of narrow slots requires an ample number thereof to provide a large intake, which ordinarily tends to lengthen the guards, but it is also desirable to limit the length of the guard so that it will not project too far into the service pipe and offer a large surface for catching passing matter. Briefly, a short guard having numerous slots is preferred, which I obtain by cutting the slots 10 very closely together, leaving a relatively small amount of stock in the ribs. Narrow or light ribs 9, on the other hand, are easily bent out of place or broken during installation or by rough handling or in shipment, and therefore, must be properly reinforced, which I accomplish by connecting them together by longitudinal ribs or bars 11, located either internally or externally, but preferably internally as internal bars permit convenient machining and slotting from the outside, an essential factor in economical production. The guard is also preferably corrugated longitudinally to give greater strength and to furnish a series of external longitudinal water-ways 14 which supplement the transverse slots to take in water. Furthermore, it may be noted that the connecting ribs or bars 11 for the transverse ribs 9 form the base of the corrugations, the transverse slots being cut only part way through the corrugations, whereby a guard of this kind may be made of either cast or drawn metal. The aggregate area of opening afforded by the slots 10 and external water-ways 14 is approximately equal to or greater than the diametrical area of passage 5, making the guard comparatively short and strong and very effective for the purpose intended.

In Figs. 5 and 6, the guard 3ª embodies a larger number of corrugations than the guard 3 shown in Figs. 1 to 4, and is slightly modified in other particulars but without material change in the essential features which bear the same reference numerals.

In Fig. 7 a guard 3ᵇ is shown which is not corrugated but otherwise substantially identical to the guard shown in Fig. 5.

What I claim is:

1. A water distributing device having a guard at its intake end comprising a hollow body rounded at one end and open at its other end and provided with external ribs and grooves extending longitudinally to the extreme ends thereof, said ribs having numerous narrow cross slots intermediate the ends of said body.

2. A guard for water distributing devices comprising a thimble having relatively close and deep corrugations longitudinally thereof, the outer projecting corrugated portions being provided with machined cross slots.

3. A water-distributing device having an intake, in combination with a guard at said intake comprising a hollow body corrugated lengthwise and having the external raised corrugations cross slotted, and having the depressions between the corrugations open at their ends to the said intake.

In testimony whereof I affix my signature in presence of two witnesses.

JOSEPH H. GLAUBER.

Witnesses:
 E. M. FISHER,
 R. B. MOSER.

Copies of this patent may be obtained for five cents each, by addressing the "Commissioner of Patents, Washington, D. C."